United States Patent [19]
Devic

[11] Patent Number: 5,875,295
[45] Date of Patent: Feb. 23, 1999

[54] INSTRUCTION FORMAT FOR ENSURING SAFE EXECUTION OF DISPLAY LIST

[75] Inventor: Goran Devic, Austin, Tex.

[73] Assignee: S3 Incorporated, Santa Clara, Calif.

[21] Appl. No.: 724,618

[22] Filed: Sep. 30, 1996

[51] Int. Cl.[6] .................................................. G06F 11/00
[52] U.S. Cl. .............................. 395/185.05; 395/185.07; 371/491
[58] Field of Search .................. 371/49.1, 49.2, 371/53, 54, 37.7; 395/185.05, 185.07, 185.02, 185.01

[56] References Cited

U.S. PATENT DOCUMENTS

| | | | |
|---|---|---|---|
| 4,583,185 | 4/1986 | Heartz et al. | 364/521 |
| 4,586,038 | 4/1986 | Sims | 340/729 |
| 4,692,880 | 9/1987 | Merz et al. | 364/521 |
| 4,714,428 | 12/1987 | Bunker et al. | 434/43 |
| 4,715,005 | 12/1987 | Heartz | 364/521 |
| 4,727,365 | 2/1988 | Bunker et al. | 340/728 |
| 4,811,245 | 3/1989 | Bunker et al. | 364/521 |
| 4,821,212 | 4/1989 | Heartz | 364/521 |
| 4,825,391 | 4/1989 | Merz | 364/526 |
| 4,855,937 | 8/1989 | Heartz | 364/521 |
| 4,862,388 | 8/1989 | Bunker | 364/521 |
| 4,905,164 | 2/1990 | Chandler et al. | 364/518 |
| 4,958,305 | 9/1990 | Piazza | 364/522 |
| 4,965,745 | 10/1990 | Economy et al. | 364/518 |
| 5,010,515 | 4/1991 | Torborg, Jr. | 364/900 |
| 5,126,726 | 6/1992 | Howard et al. | 340/728 |
| 5,187,754 | 2/1993 | Currin et al. | 382/54 |
| 5,191,642 | 3/1993 | Quick et al. | 395/127 |
| 5,268,996 | 12/1993 | Steiner et al. | 395/126 |
| 5,293,467 | 3/1994 | Buchner et al. | 395/122 |
| 5,357,579 | 10/1994 | Buchner et al. | 382/1 |
| 5,367,615 | 11/1994 | Economy et al. | 395/129 |
| 5,420,970 | 5/1995 | Steiner et al. | 395/133 |

Primary Examiner—Joseph Palys
Attorney, Agent, or Firm—Fenwick & West LLP

[57] ABSTRACT

In a computer controlled graphics system, processes are provided for detecting errors incurred in a display list having variable length instruction/parameter (I/P) sets, the errors occurring during parameterization, transmission, branching, and storage of the display list. Each process includes generating a display list including I/P sets, each I/P set including n parameter words following an instruction word. In each embodiment, a display list is encoded, transmitted, stored in a memory unit, and verified. In one embodiment, the display list is encoded by storing into each instruction word of each I/P set a parity bit of a value representative of the parity of the whole I/P set. In another embodiment, the display list is encoded by storing within each instruction word of each I/P set an m-bit checksum value. The m-bit checksum value is generated by partitioning each I/P set into y m-bit partitions which are summed, ignoring overflow. In a third embodiment, a display list is encoded by appending each I/P set with a checksum word generated by summing the instruction word and each of the n parameter words of each I/P set, ignoring overflows. In each embodiment, the encoded display list is stored in a memory unit and later accessed for verification. In each embodiment, verification is performed by re-performing the respective encoding scheme for each I/P set. Upon detection of an error, corrective action, including a debug message can be taken.

19 Claims, 10 Drawing Sheets

INSTRUCTION FORMAT FOR ENSURING SAFE EXECUTION OF DISPLAY LIST

FIELD OF THE INVENTION

The present invention relates to the field of computer controlled graphics display systems. Specifically, the present invention relates to methods for detecting errors in a display list.

BACKGROUND OF THE INVENTION

Parameterization, which refers to the generation of a display list, is typically accomplished by a host processing unit which executes a parameterization code. A display list includes a plurality of display instruction/parameter (I/P) sets, each including a display instruction and n associated display parameters required to generate a graphical image on a display device such as, for example, a cathode ray tube. Some display lists contain I/P sets of a variable length wherein each of the display I/P sets has a display instruction word and a variable number of display parameter words associated with the display instruction word. Such display lists shall be referred to herein as variable length display lists. Typically, the display list is transfered to and stored in a memory unit of a graphics subsystem before being executed. The display list is then accessed from the memory unit and executed by the graphics subsystem. The display list is typically executed by a graphics processor of the graphics subsystem which is connected as an I/O peripheral to the host processing unit.

There are a variety of potential error sources which can cause an error in the execution of a variable length display list. One potential error source is erroneous parameterization. For example, execution of a polygon instruction to render a polygon on the display device requires a certain number of parameter words. If the parameterization code executed by the host processor incorrectly loads the display list with an incorrect number of parameter words, then the display list is corrupted. For example, corruption can occur if ten display parameter words are required to render a polygon having ten vertices and the parameterization code incorrectly loads the display list with only eight display parameter words followed by a next display instruction. Without error detection, the display processor erroneously assumes that the next display instruction is the ninth display parameter associated with the previous display instruction and the display processor then renders an erroneous image on the display device and/or enters a non recoverable error mode. This example illustrates the situation where an instruction is erroneously treated as data due to erroneous parameterization.

Another potential error source in a variable length display list is a wrong address count due to an invalid display instruction branch. For example, an erroneous "go to" or "call" instruction (branch) could result in a jump to a wrong address containing no code or illegal code. A jump to such an address can result in undefined hardware behavior which causes a "crash" (e.g., unrecoverable error.) This example illustrates the situation where data is erroneously treated as an instruction.

Another potential error source in a variable length display list is corruption in transmission of signals carrying the display list from one point in the system to another. Such corruption in transmission of signals carrying the display list can result from a variety of factors including faulty components and inadequate design tolerances. Yet another potential source of errors in a display list is transient failure of a memory unit in which the display list is stored.

Therefore, a method and apparatus is needed for detecting errors incurred in a variable length display list as a result of erroneous parameterization or an illegal branch instruction (e.g., branch to data). A method and apparatus is also needed for detecting errors incurred in a variable length display list as a result of transmission signal corruption or failure of a memory unit in which the display list is stored. What is needed further is a system as above that not only detects such errors, but provides a mechanism for reporting the errors (e.g., for debugging) and also prevents the errors from causing non recoverable errors in the hardware system during image rendering. The present invention provides the above advantageous functionality.

SUMMARY OF THE INVENTION

In a computer controlled graphics system, a method is provided for detecting errors in a variable length display list incurred during parameterization, branch instructions, transmission, and storage of a graphics display list. The method of the present invention includes three embodiments. Each embodiment includes generating a display list including display instruction/parameter sets (display I/P sets), each display I/P set including a plurality of n display parameter words following a display instruction word, where n>=0. In each of the three embodiments of the present invention, the display list is: (1) encoded by the host processor, or by special logic circuitry, during parameterization; (2) transfered to and stored in a display list memory unit; and (3) verified (checked for errors) by a graphics processor, or by special logic circuitry.

In the first embodiment of the present invention, the variable length display list is encoded by computing the parity of each display I/P set to arrive at a first parity value for each display I/P set. Each display instruction word, of each display I/P set, contains a parity bit representative of the corresponding first parity value. Each display I/P set is then stored into a display list in a memory unit of a computer system. During verification of the display list, each display I/P set is accessed, via a graphics processor, from the display list in the memory unit. The parity of each accessed display I/P set is re-computed to arrive at a second parity value for each display I/P set. For each display I/P set, the first parity value is compared with the second parity value. If the first parity value equals the second parity value, the instruction is processed to render an image on a display device. If the first parity value does not equal the second parity value for one of the display I/P sets, a display list error is signaled and corrective action can be taken. Corrective action can include generating a debug report indicating the instruction type causing the error.

In the second embodiment of the present invention, the variable length display list is encoded by a first checksum encoding process. Each display I/P set is partitioned into y m-bit partitions and a checksum is performed on the partitions. For example, each of the y m-bit partitions are summed, ignoring overflow, to arrive at a first m-bit binary checksum value for each display I/P set. Each display instruction word of each display I/P set contains m bits of the first corresponding m-bit checksum value. Each display I/P set is then stored into a display list in the memory unit. During verification of the display list, each display I/P set is accessed, via a graphics processor, from the display list in the memory unit. Each accessed display I/P set is re-partitioned into y m-bit partitions. Each of the y m-bit partitions are summed, ignoring overflow, to arrive at a second m-bit checksum value for each display I/P set. The first checksum value is compared with the second checksum value for each display I/P set. If the first checksum value equals the second checksum value, the display I/P set is processed by the graphics subsystem and an image is rendered on the display unit. If the first checksum value does not equal the second checksum value for one of the display I/P sets, a display list error is signaled and corrective action can be taken. Corrective action can include generating a debug message including the instruction type causing the error.

In the third embodiment of the present invention, the variable length display list is encoded by a second checksum encoding process. For each display I/P set, the display instruction word and each of the n display instruction parameters are summed, ignoring overflows, to arrive at a first checksum value. Each display I/P set, rather than its corresponding instruction word, is appended with a first checksum word of the corresponding first checksum value. Each display I/P set is then stored into a display list in a memory unit. During verification of the display list, each display I/P set is accessed, via a graphics processor, from the display list in the memory unit. For each accessed display I/P set, the display instruction word and each of the n display instruction parameters are summed, ignoring overflows, to arrive at a second checksum value. For each display I/P set, the first checksum word is compared with the second checksum word. If the first checksum word value equals the second checksum word value, the display I/P set is processed by the graphics subsystem and an image is rendered on the display unit. If the first checksum word value does not equal the second checksum word value for one of the display I/P sets, a display list error is signaled and corrective action can be taken.

The corrective action taken upon detection of an error in the display list can include: (1) sending an interrupt signal to the host processor, (2) switching the graphics processor to an idle mode, and (3) generating a debug message including an indication of the instruction type causing the error. In the idle mode, the graphics processor stalls so that erroneous code is not executed. There is also a signal bit that sets a dedicated control register bit so that the host software may read it and find the cause for the stall.

BRIEF DESCRIPTION OF THE DRAWINGS

The present invention is illustrated by way of example, and not by way of limitation, in the figures of the accompanying drawings and in which like reference numerals refer to similar elements and in which.

DESCRIPTION OF THE PREFERRED EMBODIMENTS

In the following detailed description of the present invention graphics display list error detection processes, numerous specific details are set forth in order to provide a thorough understanding of the present invention. However, it will be obvious to one skilled in the art that the present invention may be practiced without these specific details or by using alternate elements or processes. In other instances well known processes, procedures, components, and circuits have not been described in detail as not to unnecessarily obscure aspects of the present invention.

NOTATION AND NOMENCLATURE

Some portions of the detailed descriptions which follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic signals capable of being stored, transferred, combined, compared, and otherwise manipulated in a computer system. Herein, these signals are referred to as bits, values, elements, symbols, characters, terms, numbers, or the like with reference to the present invention.

It should be borne in mind, however, that all of these terms are to be interpreted as referencing physical manipulations and quantities and are merely convenient labels and are to be interpreted further in view of terms commonly used in the art. Unless specifically stated otherwise as apparent from the following discussions, it is understood that throughout discussions of the present invention, discussions utilizing terms such as "processing" or "computing" or "calculating" or "determining" or "displaying" or the like, refer to the action and processes of a computer system, or similar electronic computing device, that manipulates and transforms data. The data is represented as physical (electronic) quantities within the computer system's registers and memories and is transformed into other data similarly represented as physical quantities within the computer system memories or registers or other such information storage, transmission or display devices.

Figure 1:
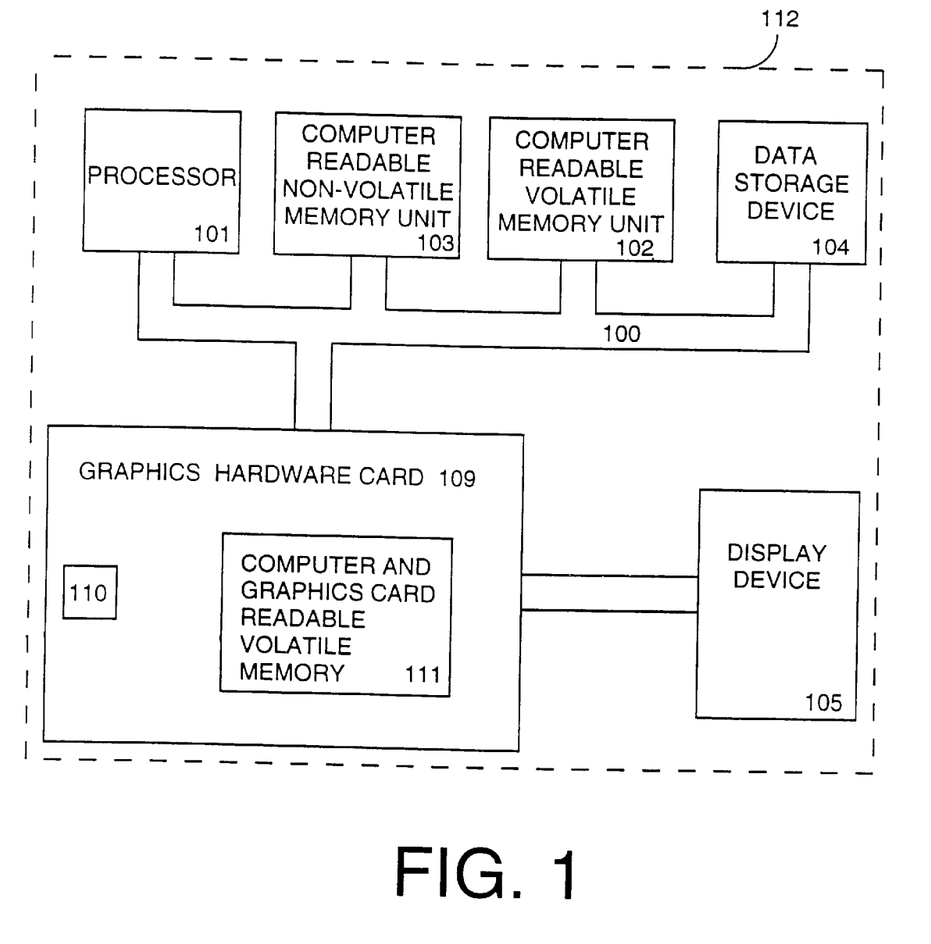
FIG. 1 is a block diagram of an exemplary host computer system including a graphics hardware card for employing processes of the present invention for detecting errors in a graphics display list.

With reference to FIG. 1, a block diagram is shown of a host computer system 112 used by the preferred embodiment of the present invention. In general, host computer system 112 used by the preferred embodiment of the present invention comprises a bus 100 for communicating information, a host processor 101 coupled with the bus 100 for processing information and instructions, a computer readable volatile memory unit 102 (e.g. random access memory unit) coupled with the bus 100 for storing information and instructions for the host processor 101, a computer readable non-volatile memory unit 103 (e.g., read only memory unit) coupled with the bus 100 for storing static information and instructions for the host processor 101, a computer readable data storage device 104 such as a magnetic or optical disk and disk drive coupled with the bus 100 for storing information and instructions, and a display device 105 coupled to the bus 100 for displaying information to the computer user. The display device 105 utilized with the computer system 112 of the present invention can be a liquid crystal device, cathode ray tube, or other display device suitable for creating graphic images and alphanumeric characters recognizable to the user.

The host system 112 provides data and control signals via bus 100 to a graphics hardware unit ("card") 109. The graphics hardware card 109 contains a display processor 110 which executes a series of display instructions found within a display list. The display processor 110 supplies data and control signals to a frame buffer which refreshes the display device 105 for rendering images on display device 105.

Parameterization, for purposes of the present invention, refers to generation of a display list. Parameterization is performed by the host processor 101 of FIG. 1. The display list includes display instruction/parameter sets (display I/P sets). As is well known, each display I/P set includes a display instruction word and n display parameter words, where n>=0. Each valid display I/P set is used to generate a graphical image on the display device 105. The number, n, of display parameter words following each display instruction varies for each display I/P set in the display list. The display list is stored in a display list memory unit before being executed by the display processor 110. The display list memory unit can be implemented by the computer readable volatile memory unit 102, the computer readable data storage device 104, or a separate volatile memory unit 111 contained within the graphics hardware card 109.

The present invention includes three embodiments of processes for detecting errors in the display I/P sets of a variable length display list. In each embodiment of the present invention, the host processor 101 generates and encodes a display list with error control information. The display list is then stored in the display list memory unit. The display list can be generated and encoded with error control information concurrently by the host processor 101 or can be generated by the host processor 101 and subsequently encoded with error control information via the host processor 101 or via special logic circuitry. Also, in each embodiment of the present invention, the graphics processor 110 accesses and verifies the encoded display list.

Figure 2A:
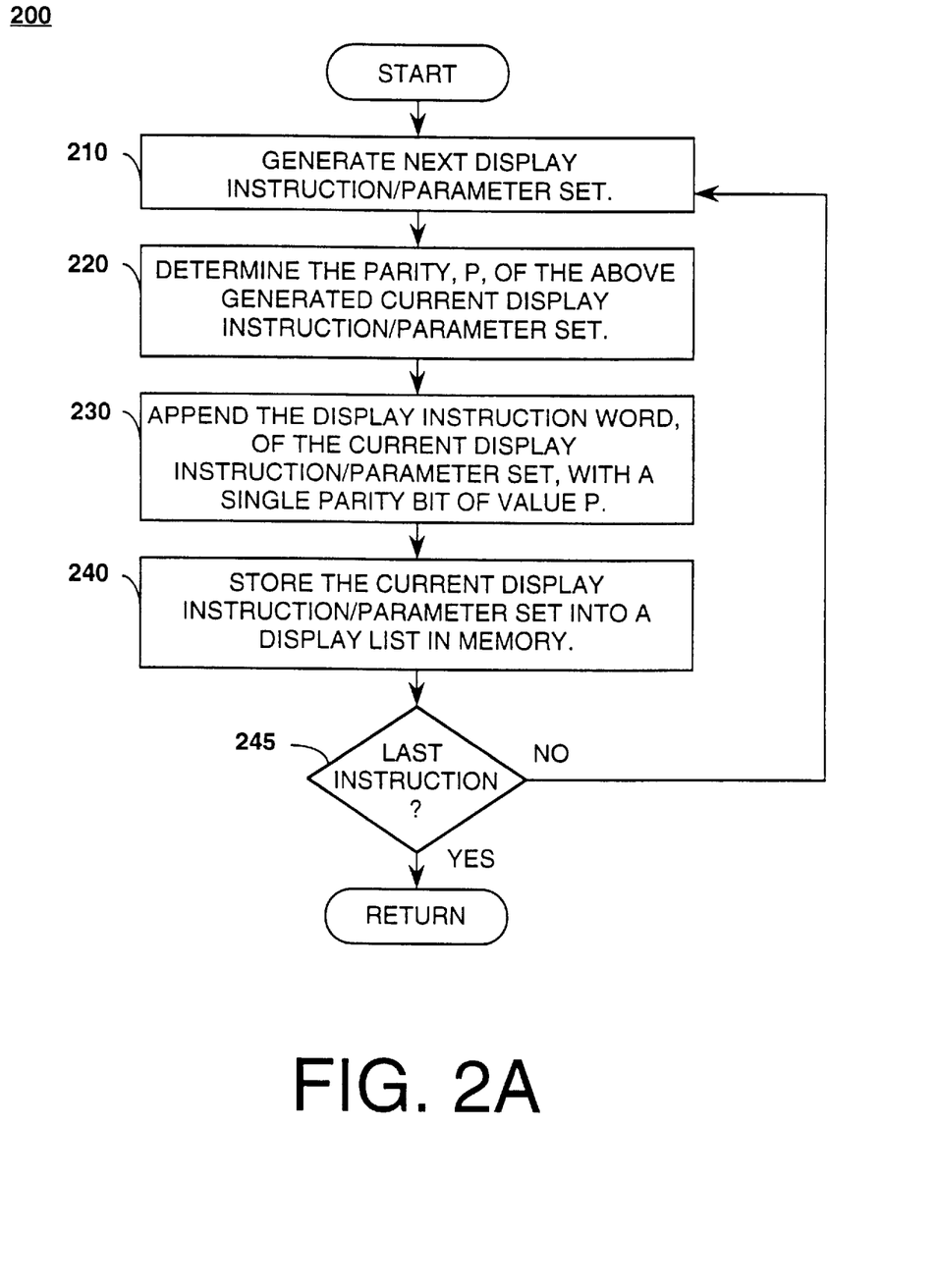
FIG. 2A is a flow diagram of parity bit encoding steps according to a first embodiment of the present invention for detecting errors in a graphics display list.
Figure 2B:
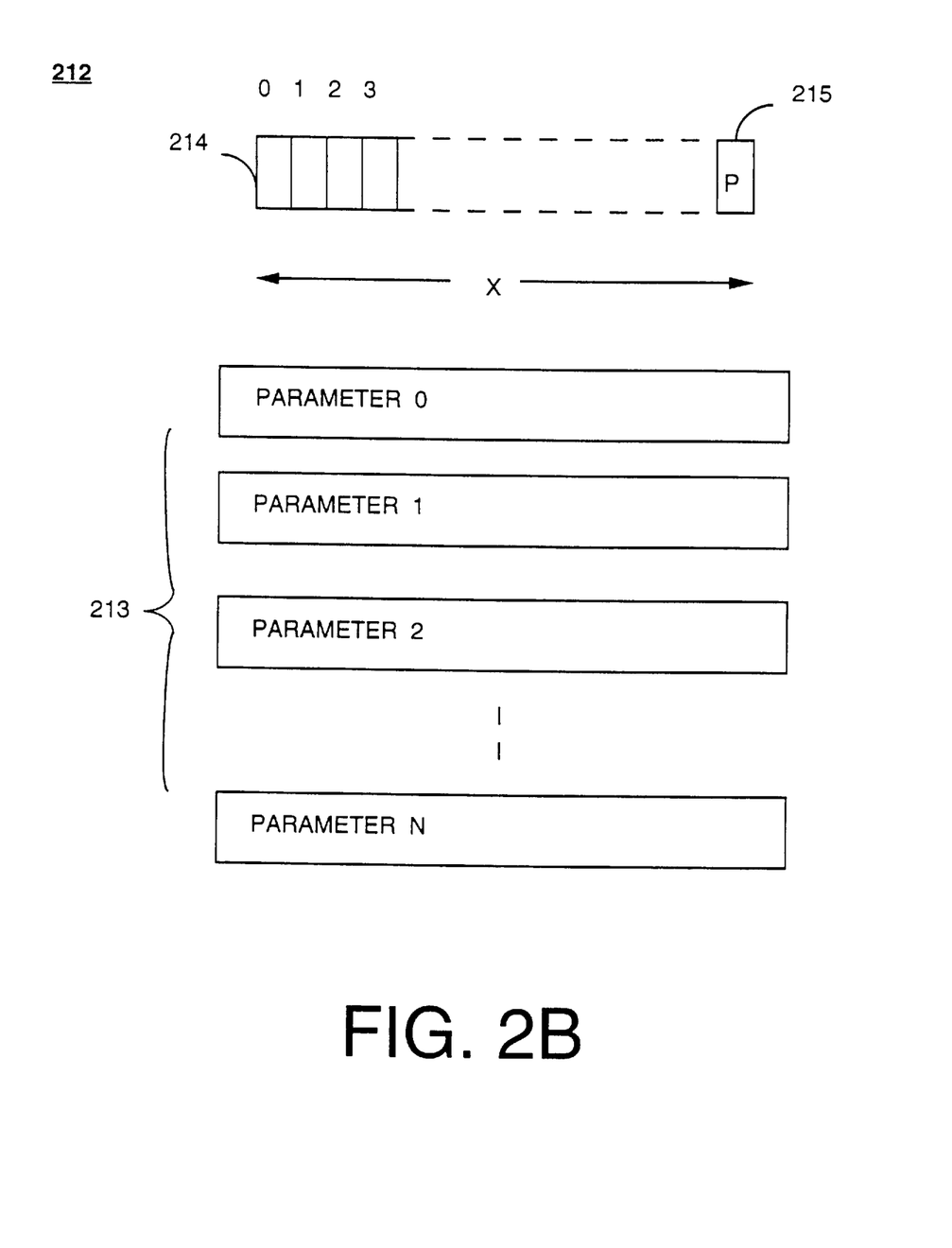
FIG. 2B is a block diagram illustrating a display instruction word including a single parity bit according to the first embodiment of the present invention for detecting errors in a graphics display list.

FIG. 2A is a flow diagram for a parity bit encoding process 200 according to a first embodiment of the method of the present invention for detecting errors in a display list. Process 200 is implemented as program code stored in computer readable memory units of system 112. The program code is executed over host processor 101. In step 210, the host processor 101 (FIG. 1) generates a next display I/P set. FIG. 2B shows a block diagram of an exemplary display I/P set 212 including n display parameter words 213 following an instruction word 214, where n>=0. The instruction word 214 has x instruction bits. Step 210 can be performed using a number of well known processes and graphics parameterization techniques. Referring back to FIG. 2A, step 220 of the parity bit encoding process 200 calls for determining the parity, P, of the current display I/P set generated in the previous step 210. Step 220 can be performed using a number of well known techniques to compute parity (e.g., using odd or even parity procedures). Step 230 calls for storing into the display instruction word, of the current display I/P set, a single parity bit of value P. FIG. 2B shows the instruction word 214 containing a single parity bit 215 of value P in accordance with step 230. The parity value, P, can be stored in any bit location of instruction word 214. Referring back to FIG. 2A, step 240 calls for storing the current display I/P set into a display list in the display list memory unit. Decision block 245 determines whether the current display I/P set is the last display I/P set in the parameterization process and, if so, the parity bit encoding process 200 is completed. If the current display I/P set is not the last display I/P set in the parameterization process, then the process 200 loops back to step 210 again and generates the next display I/P set.

Figure 2C:
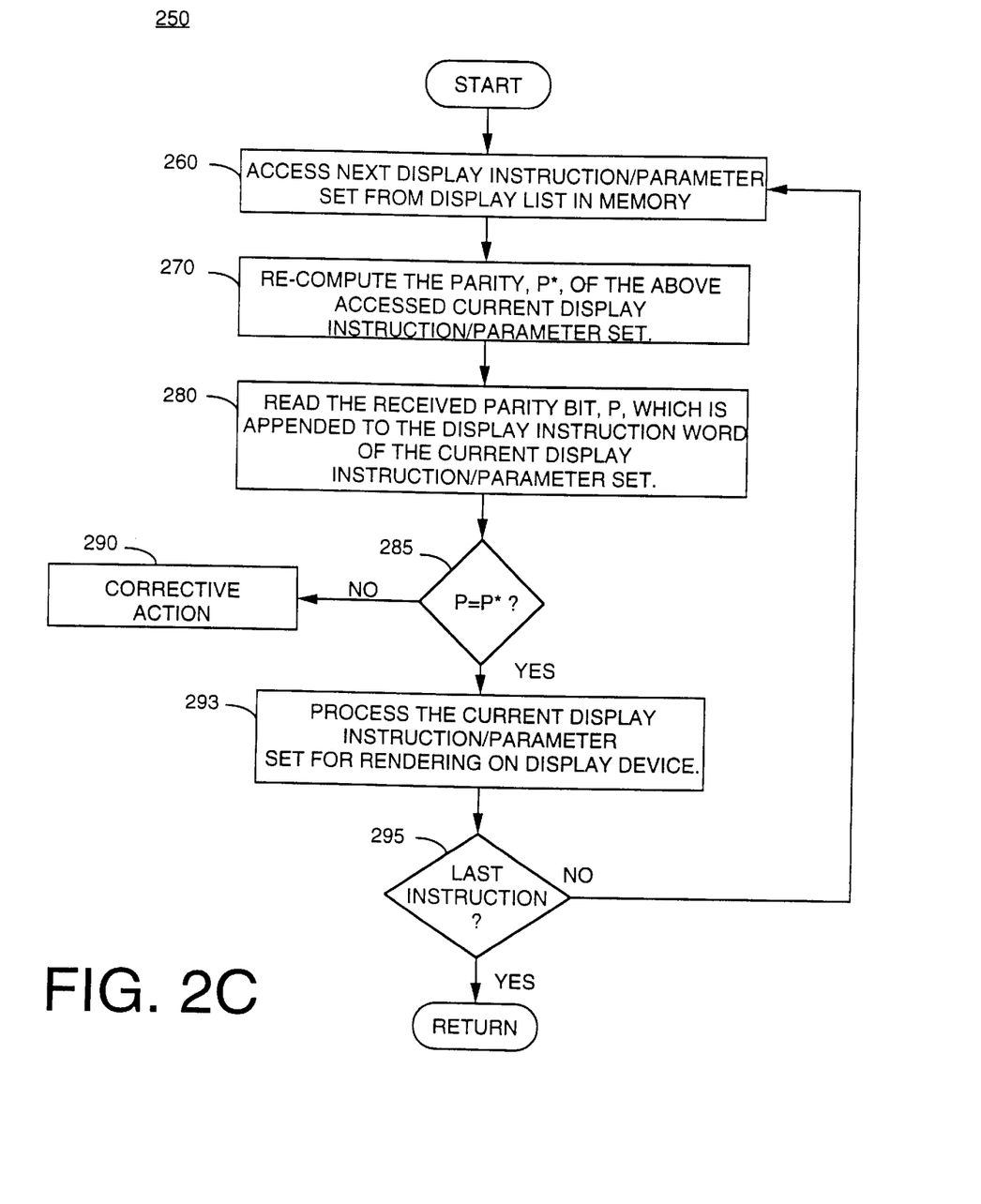
FIG. 2C is a flow diagram of parity bit verification steps according to the first embodiment of the present invention for detecting errors in a graphics display list.

FIG. 2C is a flow diagram illustrating a parity bit verification process 250 according to the first embodiment of the method of the present invention for detecting errors in a display list. In the first embodiment of the method of the present invention, the parity bit verification process 250 is used in conjunction with the parity bit encoding process 200 (FIG. 2A) to detect errors in a display list. Process 250 is performed by graphics processor 110 and process 250 is implemented as program code stored in a computer readable memory unit of system 112. Referring to FIG. 2C, in step 260 the graphics processor 110 (FIG. 1), during image rendering, accesses a next display I/P set from the display list which is generated and stored in the display list memory unit according to the parity bit encoding process 200. Step 270 calls for re-computing the parity, P*, of the current display I/P set accessed in the previous step 260. In order to recompute the parity, processor 110 determines the boundary of the current I/P set. This determination can be made using a special instruction word indicator stored in each instruction word of the display list. In this embodiment, processor 101 searches forward until it reaches the next instruction word to determine the boundary of the current I/P set. Alternatively, each instruction word can contain an indication of its length and the processor 110 can use this stored length information to determine the boundary of the current I/P set.

Step 280 calls for reading the received parity bit, P, which is contained within the display instruction word of the current display I/P set. Decision block 285 compares the values of P and P*. If P equals P* for the current display I/P set, then it is assumed that no error exists in the current display I/P set and process 293 is entered to process the current I/P set for rendering an image on display device 105. If P does not equal P* for the current display I/P set, then it is assumed that an error exists in the current display I/P set and the process 250 proceeds to a corrective action step 290. Corrective action step 290 can include: (1) generating a stall signal for stalling the host processor 101; (2) switching the graphics processor 110 (FIG. 1) from an operation mode to an idle mode wherein the graphics processor 110 stops processing temporarily; and (3) generating a debug message including an indication of the instruction type causing the error. Generating a debug message, including an indication of the instruction type causing the error, is particularly useful during debugging phases.

Step 295 determines whether the display I/P set accessed in step 260 is the last display I/P set in the display list. If the display I/P set accessed in step 260 is the last display I/P set in the display list, then the process 250 ends. If the display I/P set accessed in step 260 is not the last display I/P set in the display list, then process 250 returns to step 260 to access the next display I/P set.

Figure 3A:
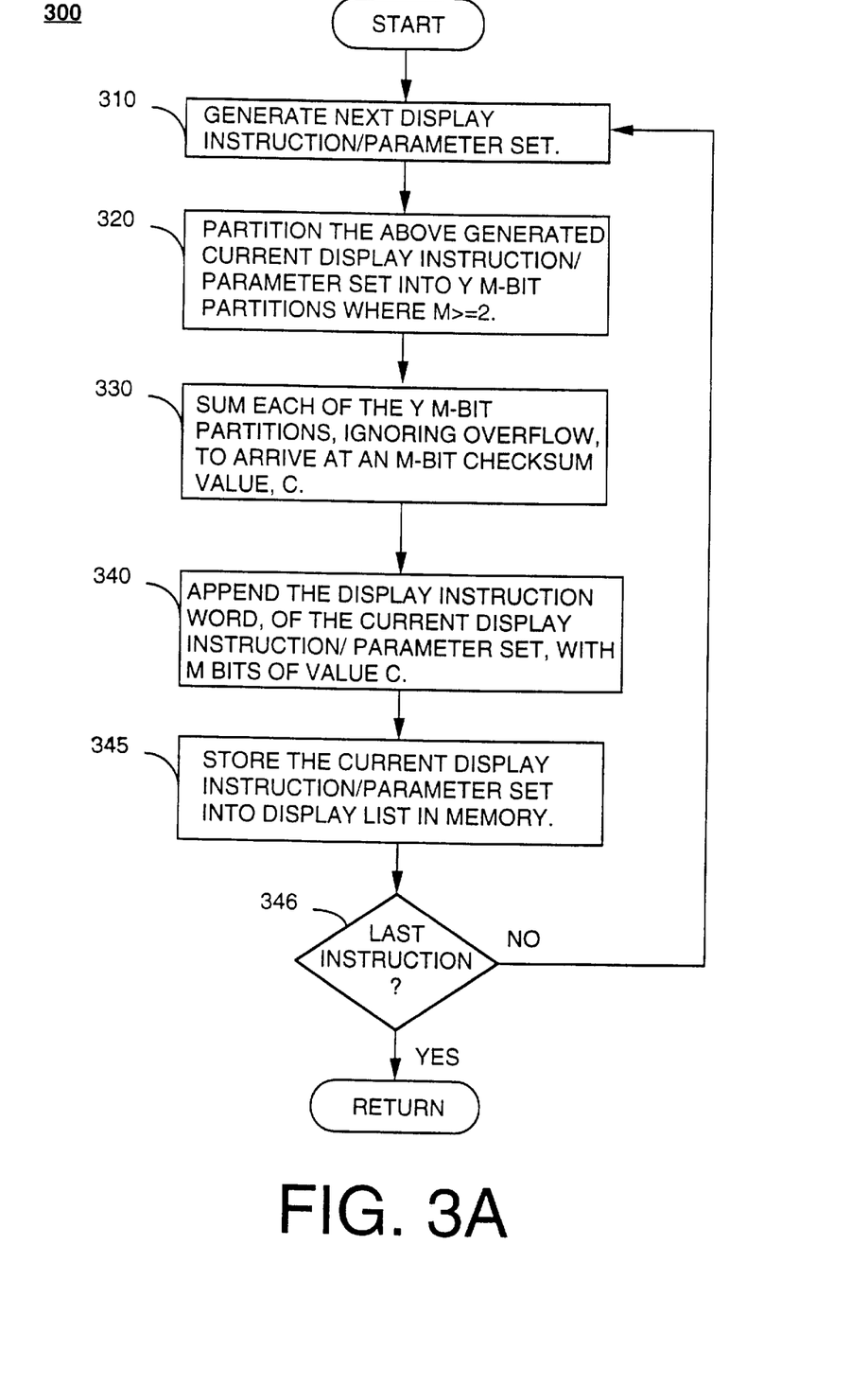
FIG. 3A is a flow diagram of checksum encoding steps according to a second embodiment of the present invention for detecting errors in a graphics display list.
Figure 3B:
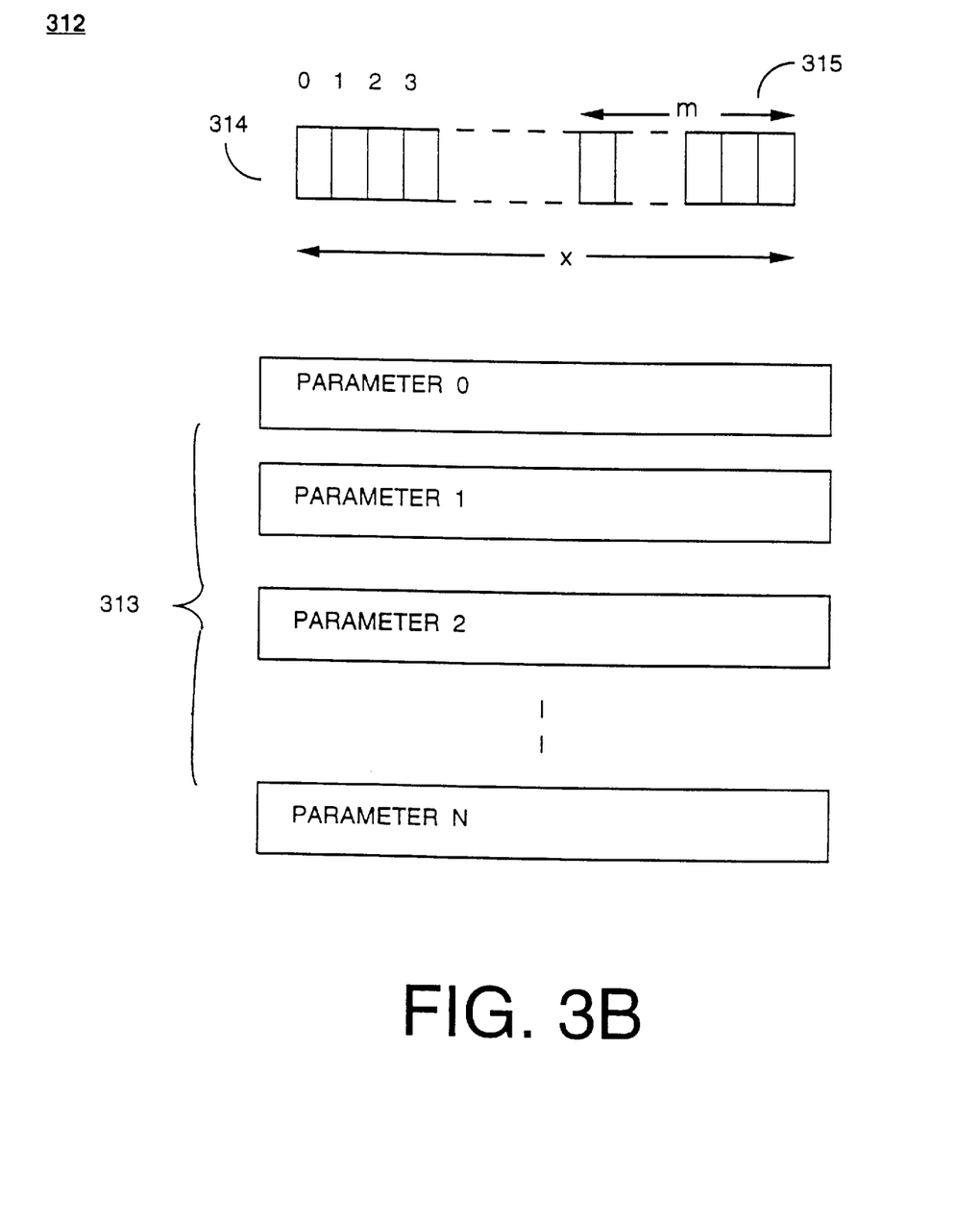
FIG. 3B is a block diagram illustrating a display instruction word including m checksum bits according to the second embodiment of the present invention for detecting errors in a graphics display list.

FIG. 3A is a flow diagram illustrating a first checksum encoding process 300 according to a second embodiment of the present invention for detecting errors in a display list. Process 300 is implemented as program code stored in a computer readable memory unit of system 112. In step 310, the host processor 101 (FIG. 1) generates a next display I/P set using well known parameterization techniques. FIG. 3B shows a block diagram of an exemplary display I/P set 312 of the second embodiment including n display parameter words 313 following an instruction word 314, where n>=0. The instruction word 314 has x instruction bits. Referring back to FIG. 3A, step 320 of the encoding process 300 calls for partitioning the current display I/P set, generated in the previous step 310, into y m-bit partitions, where m>=2. Step 330 calls for summing each of the y m-bit partitions, for the current display I/P set, ignoring overflow, to arrive at an m-bit checksum value, C. Step 330 can be implemented using well known checksum techniques. Step 340 calls for storing in the display instruction word, of the current display I/P set, m bits of the checksum value, C.

FIG. 3B shows the instruction word 314 containing m bits 315 having the checksum value, C, in accordance with step 330. In one implementation, the exemplary instruction word 314 is appended with four bits (m=4). Referring back to FIG. 3A, step 345 calls for storing the current display I/P set into a display list in the display list memory unit. Decision block 346 determines whether the current display I/P set is the last display I/P set in the parameterization process and, if so, the encoding process 300 is completed. If the current display I/P set is not the last display I/P set in the parameterization process, then the process 300 proceeds to step 310 again and a next display I/P set is generated.

Figure 3C:
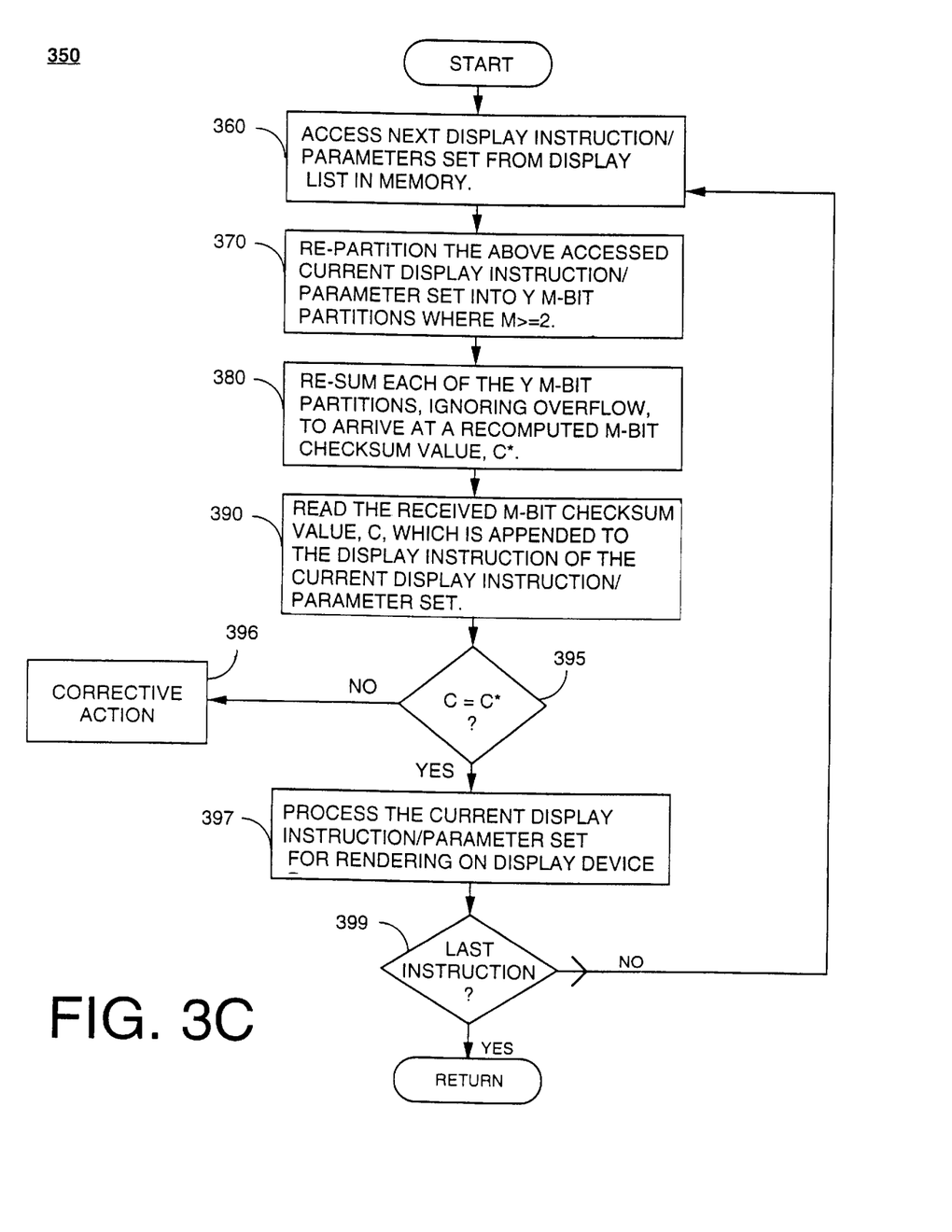
FIG. 3C is a flow diagram of checksum verification steps according to the second embodiment of the present invention for detecting errors in a graphics display list.

FIG. 3C is a flow diagram illustrating a checksum verification process 350 according to the second embodiment of the present invention for detecting errors in a display list. Process 350 is executed by processor 110 of system 112 and is realized as program code stored in a computer readable memory unit of system 112. In the second embodiment of the method of the present invention, the checksum verification process 350 is used in conjunction with the checksum encoding process 300 (FIG. 3A) to detect errors in a display list. In step 360, the graphics processor 110 (FIG. 1) accesses a next display I/P set from the stored display list generated according to the above described checksum encoding process 300. The boundary of an I/P set is determined in step 360 in a manner analogous to steps 260 and 270 (FIG. 2C). Step 370 calls for re-partitioning the current display I/P set, accessed in the previous step 360, into y m-bit partitions. Step 380 requires summing each of the y m-bit partitions, for the current display I/P set, ignoring overflow, to arrive at a second m-bit checksum value, C*, using well known checksum procedures.

Step 390 calls for reading the received m-bit checksum value which is stored in the display instruction word of the current display I/P set. Decision block 395 compares the values of C and C*. If C is equal to C*, then it is assumed that no error exists in the current display I/P set and process 350 proceeds to step 397 which renders the current I/P set on display device 105 (FIG. 1). If C is not equal to C* for the current display I/P set, then it is assumed that an error exists in the current display I/P set and the process 350 proceeds to a corrective action step 396. Corrective action step 396 can include: (1) generating a stall signal for stalling the host processor 101; (2) switching the graphics processor 110 (FIG. 1) from an operation mode to an idle mode wherein the graphics processor 110 stops processing temporarily; and (3) generating a debug message including an indication of the instruction type causing the error. Step 399 determines whether the display I/P set accessed in step 360 is the last display I/P set in the display list. If the display I/P set accessed in step 360 is the last display I/P set in the display list, then the process 350 ends. If the display I/P set accessed in step 360 is not the last display I/P set in the display list, then process 350 returns to step 360 to access the next display I/P set.

Figure 4A:
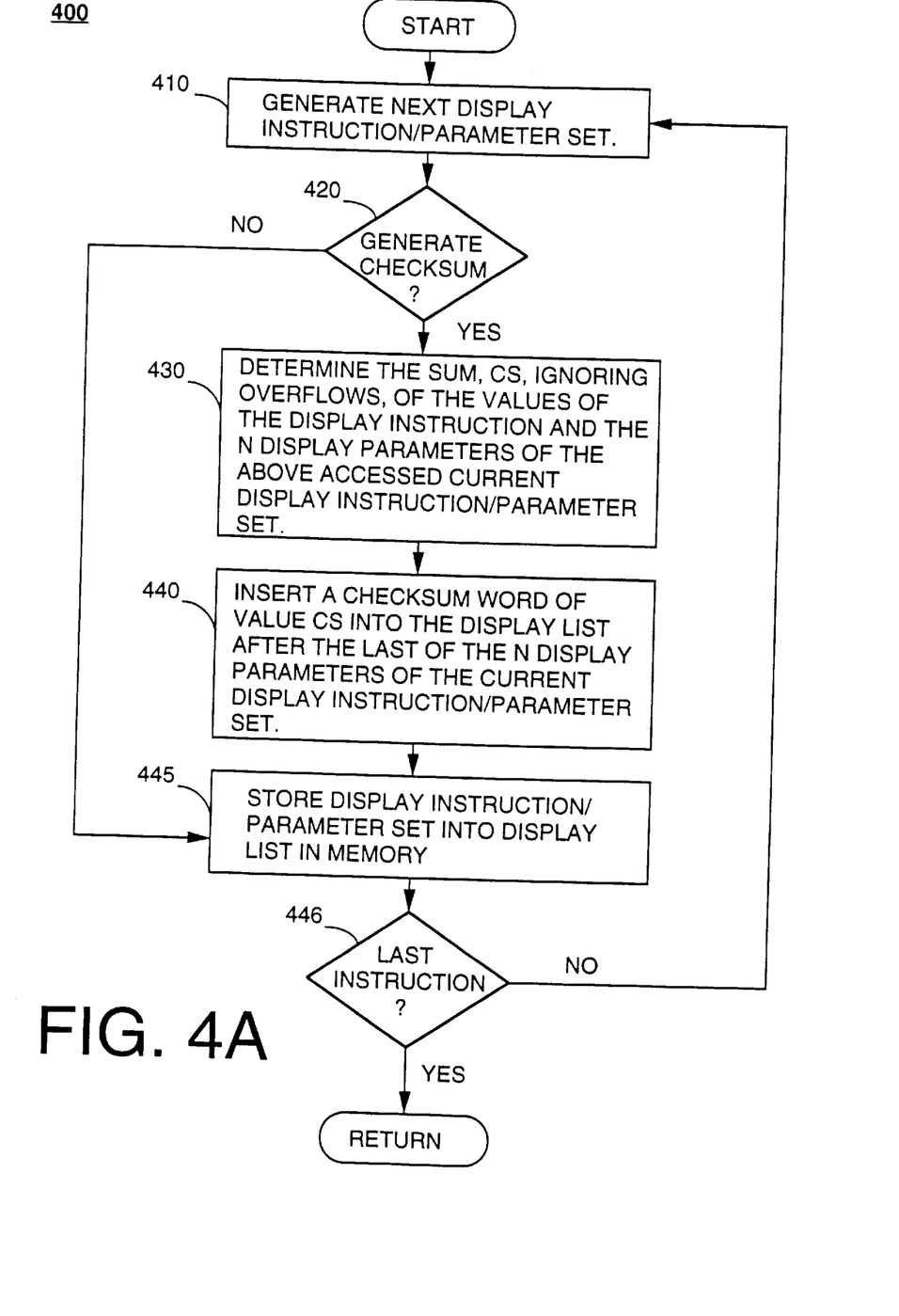
FIG. 4A is a flow diagram of checksum encoding steps according to a third embodiment of the present invention for detecting errors in a graphics display list.
Figure 4B:
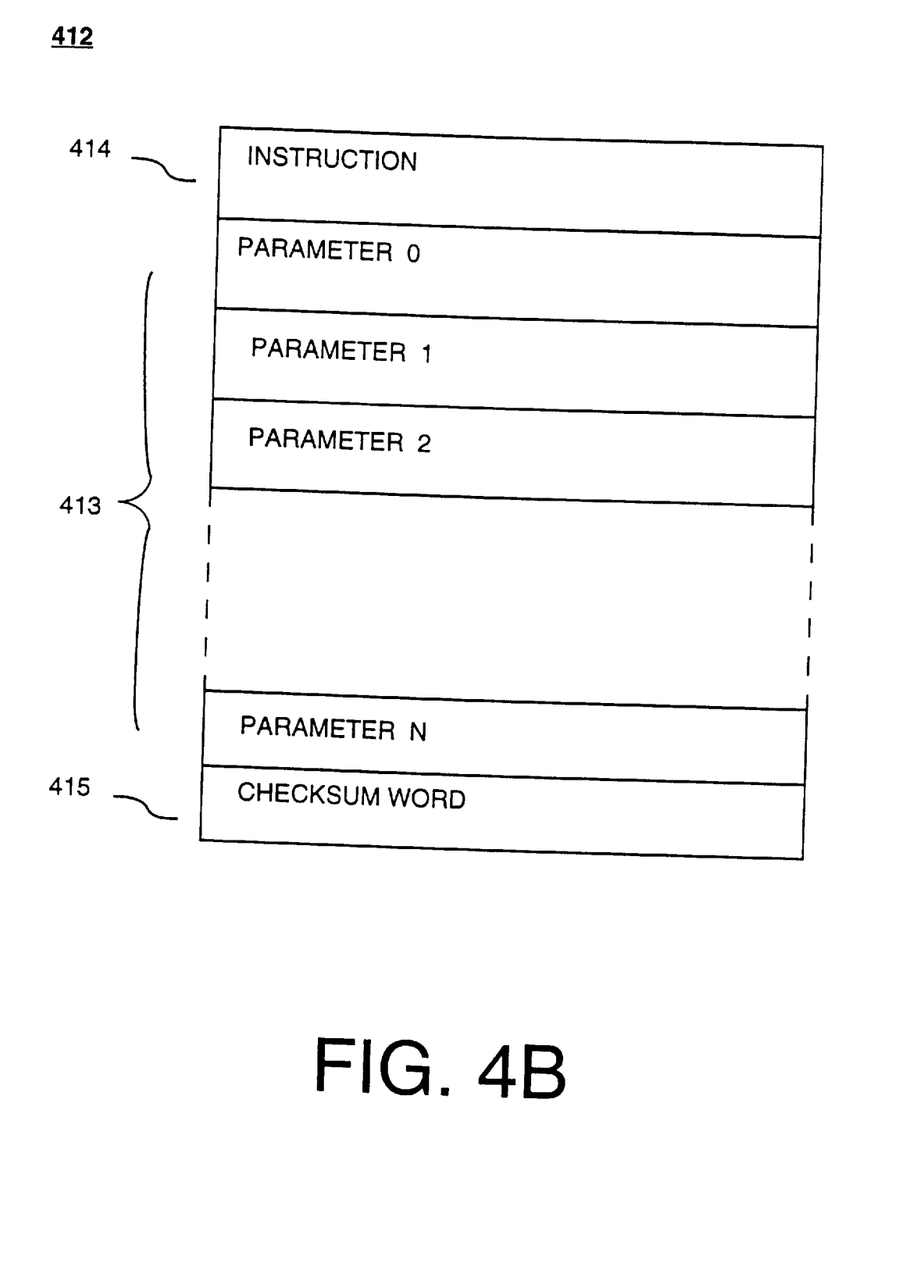
FIG. 4B is a block diagram illustrating a separate checksum word for placement at the end of each display instruction/parameter set according to the third embodiment of the present invention for detecting errors in a graphics display list.

FIG. 4A is a flow diagram illustrating a second checksum encoding process 400 according to a third embodiment of the present invention for detecting errors in a display list. Process 400 is executed by host processor 101 and is stored as program code in computer readable memory units in system 112. In step 410, the host processor 101 (FIG. 1) generates a next display I/P set. FIG. 4B shows a block diagram of an exemplary display I/P set 412 including n display parameter words 413 following an instruction word 414, where n>=0. The third embodiment of the present invention, for detecting errors in a display list, includes a control feature which enables a user to select whether or not to encode and verify the display list using the checksum values. Referring back to FIG. 4A, decision block 420 determines if a control bit has been set to enable encoding of the display list. If the control bit has been set to encode the current display I/P set, then the process 400 proceeds to step 430 for encoding. If the control bit has not been set to encode the current display I/P set, then the process proceeds to step 445 to store the current display I/P set in the display list without the checksum value encoded therein.

The step 430 of the encoding process 400 calls for summing the values, ignoring overflows, of the display instruction and the n display parameters of the current display I/P set to arrive at a first checksum value, CS, using well known checksum procedures. Step 440 calls for appending the current display I/P set with a first checksum word of the first checksum value, CS. FIG. 4B shows an exemplary display I/P set 412 including n display parameter words 413 following an instruction word 414. The exemplary display I/P set 412 is shown appended with a checksum word 415 of the first checksum value, CS, in accordance with step 430. Referring back to FIG. 4A, step 445 calls for storing the current display I/P set into a display list in the display list memory unit. Decision block 446 determines whether the current display I/P set is the last display I/P set in the parameterization process 400 and, if so, the encoding process 400 is completed. If the current display I/P set is not the last display I/P set in the parameterization process 400, then the checksum encoding process 400 proceeds to step 410 again and a next display I/P set is generated.

Figure 4C:
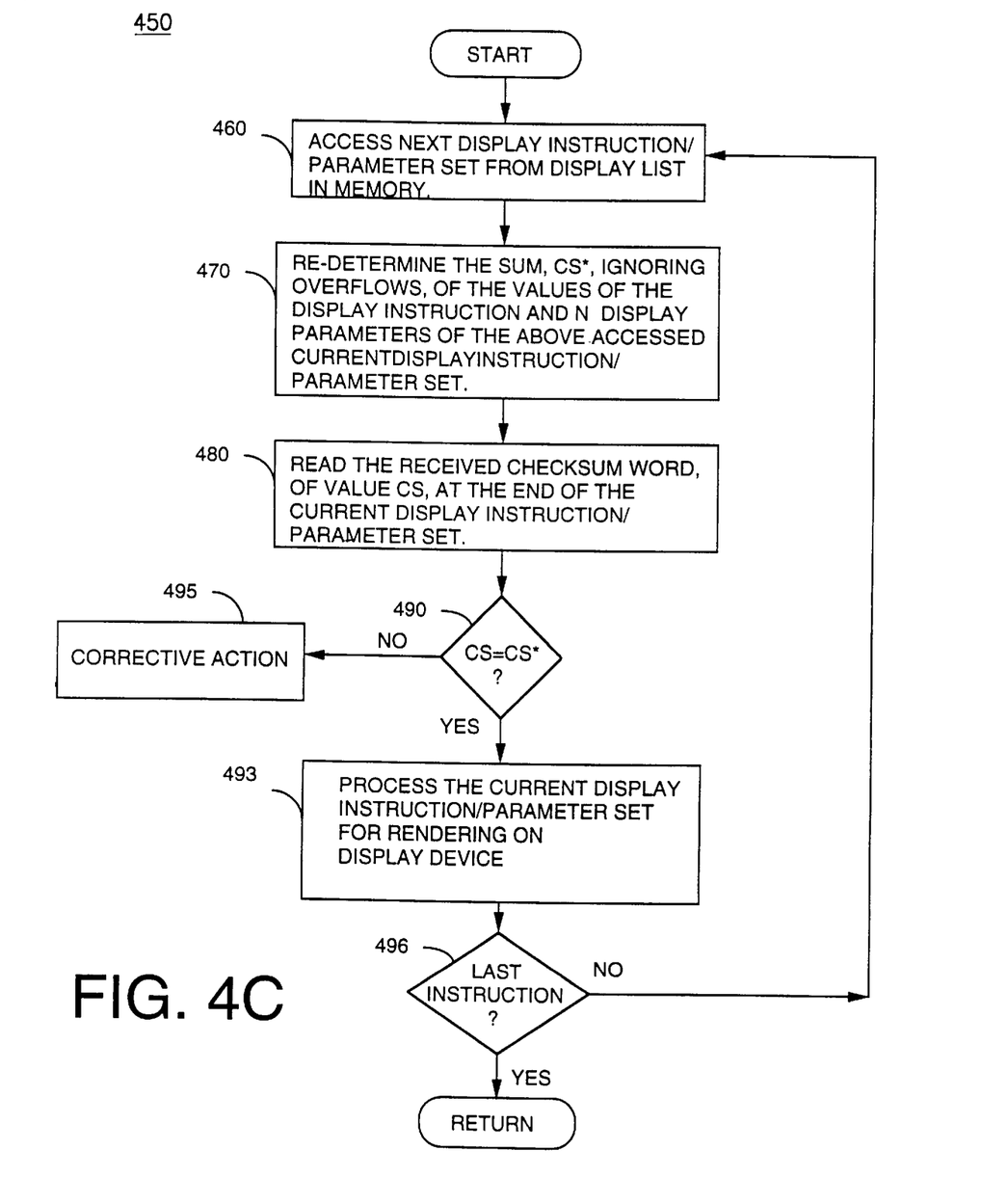
FIG. 4C is a flow diagram of checksum verification steps according to the third embodiment of the present invention for detecting errors in a graphics display list.

FIG. 4C is a flow diagram illustrating a checksum verification process 450 according to the third embodiment of the present invention for detecting errors in a display list. Verification process 450 is executed by graphics processor 110 and is realized as program code stored in a computer readable memory unit within system 112 (FIG. 1). In the third embodiment of the method of the present invention, the checksum verification process 450 is used in conjunction with the checksum encoding process 400 (FIG. 4A) to detect errors in a display list. In step 460, the graphics processor 110 (FIG. 1) accesses a next display I/P set from the stored display list generated according to the above described second checksum encoding process 400. The boundary of the display I/P set is determined in a manner analogous to steps 260 and 270 (FIG. 2C).

Step 470 calls for re-determining the sum, ignoring overflow, of the display instruction word and the n display instruction parameters of the current display I/P set, accessed in the previous step 460, to arrive at a second checksum value, CS*, using well known techniques. Step 490 calls for reading the received checksum word which is appended to the current display I/P set. Decision block 490 compares the values of CS and CS*. If CS is equal to CS*, then it is assumed that no error exists in the current display I/P set and process 450 proceeds to step 493 which renders the current I/P set on display device 105 (FIG. 1). If CS is not equal to CS*, then it is assumed that an error exists in the current display I/P set and the process 450 proceeds to a corrective action step 495. Corrective action step 495 can include: (1) generating a stall signal for stalling the host processor 101; (2) switching the graphics processor 110 (FIG. 1) from an operation mode to an idle mode wherein the graphics processor 110 stops processing temporarily; and (3) generating a debug message including an indication of the instruction type causing the error. Step 496 determines whether the display I/P set accessed in step 460 is the last display I/P set in the display list. If the display I/P set accessed in step 460 is the last display I/P set in the display list, then the process 450 ends. If the display I/P set accessed in step 460 is not the last display I/P set in the display list, then process 450 returns to step 460 to access the next display I/P set.

As previously mentioned, the third embodiment of the present invention includes a control feature which enables a user to select whether or not to encode and verify the display list using the checksum values. Referring back to FIG. 4A, decision block 420 determines if a control bit has been set to enable encoding of the display list. If the control bit has not been set to encode the current display I/P set, then the process proceeds to store the current display I/P set in the display list without the checksum value encoded therein. This control feature is particularly useful during development stages wherein the interface between the software parameterization routine and the hardware graphics processing subsystem is developed. After the interface between software and hardware is debugged, the user can eliminate the checksum encoding steps 430 and 440 (FIG. 4A) to enhance graphics processing performance.

The three embodiments of the method of the present invention, instruction formats for ensuring safe execution of a display list, are thus described. While the present invention has been described in particular embodiments, it should be appreciated that the present invention should not be construed as limited by such embodiments, but rather construed according to the below claims.

What is claimed is:

1. In a computer controlled graphics system having a host processor, a graphics processor, a memory unit, and a display unit, a computer implemented method for detecting errors in a display list, said method comprising the steps of:

generating a sequence of display instruction/parameter sets, via said host processor, each display instruction/parameter set including n display parameter words following a display instruction word;

computing the parity of each display instruction/parameter set to arrive at a first parity value;

storing into each display instruction word of each display instruction/parameter set said first parity value;

storing each display instruction/parameter set into a display list in a memory unit;

determining a boundary for each stored display instruction/parameter set, wherein said boundary is defined by consecutive display instruction words of said sequence of display instruction/parameter sets;

accessing, via said graphics processor, each display instruction/parameter set from said display list in said memory unit;

computing the parity of each accessed display instruction/parameter set to arrive at a second parity value;

comparing, for each display instruction/parameter set, said first parity value with said second parity value; and initiating corrective action, for each display instruction/parameter set, if said first parity value does not equal said second parity value.

2. The method of claim 1 further comprising a step of rendering an image on said display unit for each display instruction/parameter set provided said first parity value equals said second parity value.

3. The method of claim 2 wherein said steps of computing said first parity value and computing said second parity value are performed respectively by said host processor and said graphics processor.

4. The method of claim 2 wherein said step of initiating corrective action includes the step of generating a debug message including an indication of the instruction type causing the error.

5. The method of claim 2 wherein said step of initiating corrective action includes the steps of switching said graphics processor to an idle mode so that an erroneous display instruction/parameter set is not executed.

6. The method of claim 2 wherein said memory unit is a memory unit on a graphics display card of said computer system.

7. In a computer controlled graphics system having a host processor, a graphics processor, a memory unit, and a display unit, a computer implemented method for detecting errors in a display list, said method comprising the steps of:

generating a sequence of display instruction/parameter sets, via said host processor, each display instruction/parameter set including n display parameter words following a display instruction word;

partitioning each display instruction/parameter set into y m-bit partitions;

summing each of said y m-bit partitions, ignoring overflow, to arrive at a first m-bit checksum value;

storing into each display instruction word of each display instruction/parameter set m bits of said first corresponding m-bit checksum value;

storing each display instruction/parameter set into a display list in a memory unit;

determining a boundary for each stored display instruction/parameter set, wherein said boundary is defined by consecutive display instruction words of said sequence of display instruction/parameter sets;

accessing, via said graphics processor, each display instruction/parameter set from said display list in said memory unit;

partitioning each accessed display instruction/parameter set into y m-bit partitions;

summing each of said y m-bit partitions, ignoring overflow, to arrive at a second m-bit checksum value for each display instruction/parameter set;

comparing said first checksum value with said second checksum value for each display instruction/parameter set; and initiating corrective action, for each display instruction/parameter set, if said first checksum value does not equal said second checksum value.

8. The method of claim 7 further comprising a step of rendering an image, for each display instruction/parameter set, on said display unit provided said first checksum value equals said second checksum value.

9. The method of claim 8 wherein said steps of computing said first m-bit checksum value and computing said second m-bit checksum value are performed respectively by said host processor and said graphics processor.

10. The method of claim 8 wherein said step of initiating corrective action includes the step of generating a debug message including an indication of the instruction type causing the error.

11. The method of claim 8 wherein said step of initiating corrective action includes the step of switching said graphics processor to an idle mode so that an erroneous instruction/parameter set is not executed.

12. The method of claim 8 wherein said memory unit is a memory unit on a graphics display card of said computer system.

13. The method of claim 8 wherein each display instruction/parameter set is partitioned into m=4 bit partitions.

14. In a computer controlled graphics system having a host processor, a graphics processor, a memory unit, and a display unit, a computer implemented method for detecting errors in a display list, said method comprising the steps of:

generating a sequence of display instruction/parameter sets, via said host processor, each display instruction/parameter set including n display parameter words following a display instruction word;

computing the checksum of each display instruction/parameter set, ignoring overflows, to arrive at a first checksum value;

appending each display instruction/parameter set with a first checksum word of said corresponding first checksum value, the first checksum word having a same number of bits as one of the display parameter words;

storing each display instruction/parameter set into a display list in a memory unit;

determining a boundary for each stored display instruction/parameter set, wherein said boundary is defined by consecutive display instruction words of said sequence of display instruction/parameter sets;

accessing, via said graphics processor, each display instruction/parameter set from said display list in said memory unit;

computing the checksum of each accessed display instruction/parameter set, ignoring overflows, to arrive at a second checksum value;

comparing, for each display instruction/parameter set, said first checksum word with said second checksum word; and signaling a display list error, for each display instruction/parameter set, if said first checksum word does not equal said second checksum word.

15. The method of claim 14 further comprising a step of rendering an image, for each display instruction/parameter set, on said display unit provided said first checksum word equals said second checksum word.

16. The method of claim 15 wherein said steps of computing said first checksum value and computing said second checksum value are performed respectively by said host processor and said graphics processor.

17. The method of claim 15 wherein said step of initiating corrective action includes the step of generating a debug message including an indication of the instruction type causing the error.

18. The method of claim 15 wherein said step of initiating corrective action includes the step of switching said graphics processor to an idle mode so that an erroneous instruction/parameter set is not executed.

19. The method of claim 15 further including a step of disabling said steps of computing, appending, comparing, and signaling provided an error detection control bit is preset by a user to disable error detection.

* * * * *